A. C. FISHER.
FOLDING CAMERA.
APPLICATION FILED JAN. 5, 1917.

1,268,950.

Patented June 11, 1918.
2 SHEETS—SHEET 1.

Witnesses
Nelson H. Copp
Russell B. Griffith

INVENTOR
Austin Carl Fisher
BY
his ATTORNEYS

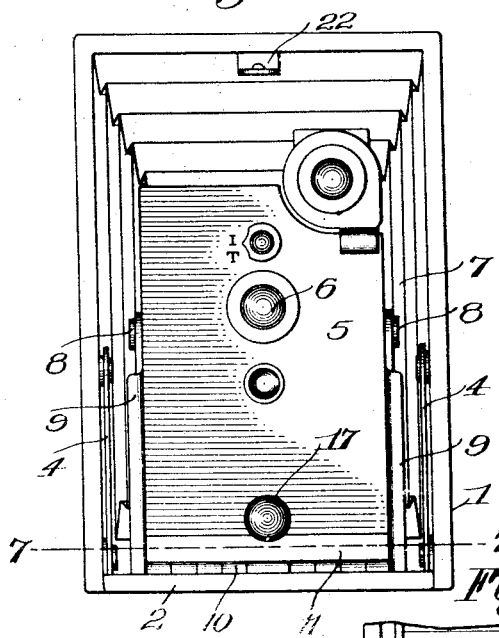
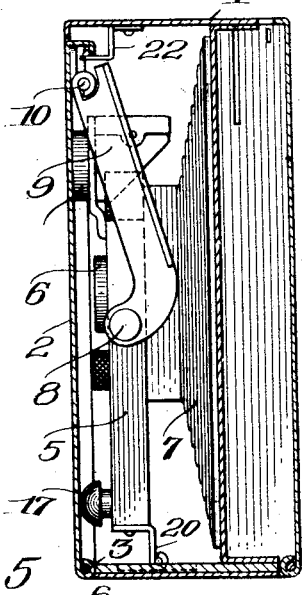
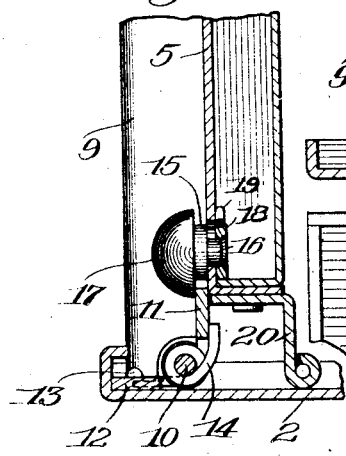
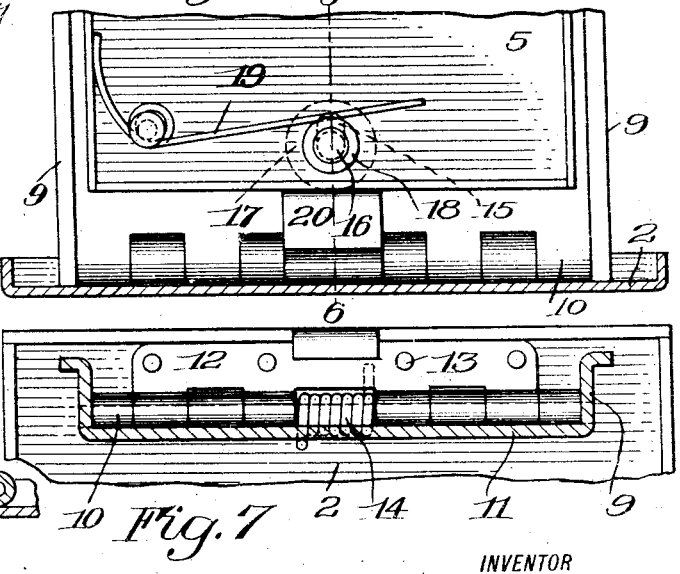
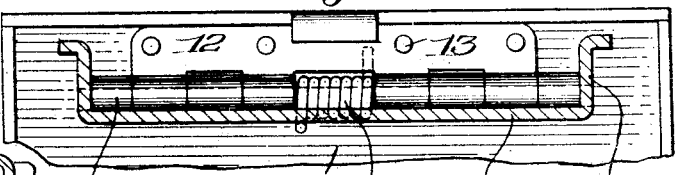

UNITED STATES PATENT OFFICE.

AUSTIN CARL FISHER, OF ROCHESTER, NEW YORK, ASSIGNOR TO EASTMAN KODAK COMPANY, OF ROCHESTER, NEW YORK, A CORPORATION OF NEW YORK.

FOLDING CAMERA.

1,268,950.  Specification of Letters Patent.  Patented June 11, 1918.

Application filed January 5, 1917. Serial No. 140,687.

*To all whom it may concern:*

Be it known that I, AUSTIN CARL FISHER, of Rochester, in the county of Monroe and State of New York, have invented certain new and useful Improvements in Folding Cameras; and I do hereby declare the following to be a full, clear, and exact description of the same, reference being had to the accompaying drawings, forming a part of this specification, and to the reference-numerals marked thereon.

My present invention relates to photography, and more particularly to photographic cameras of the folding type and it has for its object to provide a simple, efficient and inexpensive camera of this nature in which the lens front will be automatically projected into its position of focus when the camera is opened. The improvements are directed in part toward provisions whereby the front will be held securely and rigidly in operative position though adapted to be readily released for the purpose of folding the camera. To these and other ends the invention resides in certain improvements and combinations of parts all as will be hereinafter more fully described, the novel features being pointed out in the claims at the end of the specification.

In the drawings:

Fig. 3 is a front elevation of the camera extended;

Fig. 4 is a vertical sectional view taken in a plane just inside one of its side walls with the parts in folded position;

Fig. 5 is an enlarged fragmentary detail sectional view showing the latch for the front taken substantially on the line 5—5 of Fig. 1;

Fig. 6 is a sectional view taken substantially on the line 6—6 of Fig. 5, and

Fig. 7 is a fragmentary detail sectional view through the supporting links for the front taken substantially on the line 7—7 of Fig. 3.

Similar reference numerals throughout the several views indicate the same parts.

Figure 1:
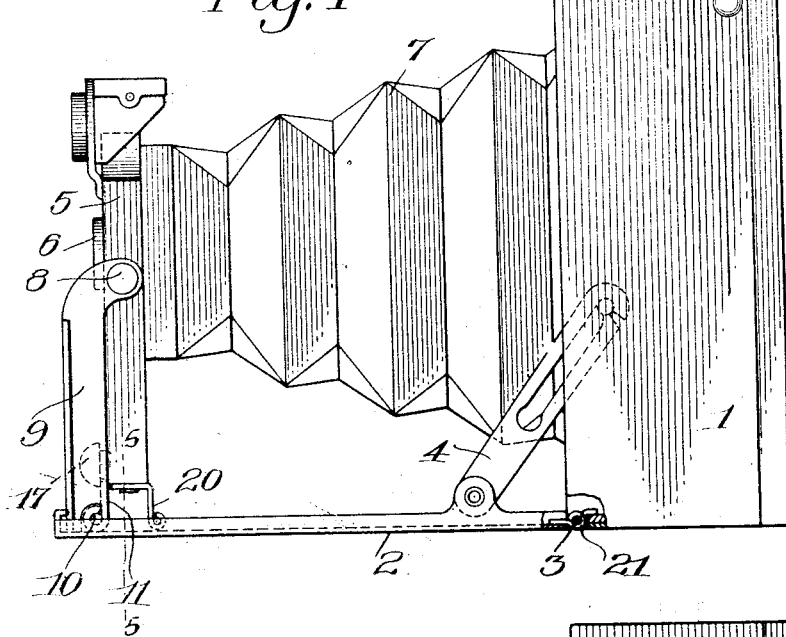
Figure 1 is a side elevation of a folding camera constructed in accordance with and illustrating one embodiment of my invention, the same being in extended position.

In the present embodiment, the camera comprises a body 1 the front of which is closed when the camera is folded by the usual bed 2 hinged thereto at 3 and acting also as a door. The bed when extended to operative position as in Fig. 1 is supported by links 4 connecting it to the body. A front 5 carrying the lens 6 is connected to the body 1 by a bellows 7 and the front and bellows fold within the body of the camera as shown in Fig. 4, these being the general characteristics of a folding camera.

Figure 2:
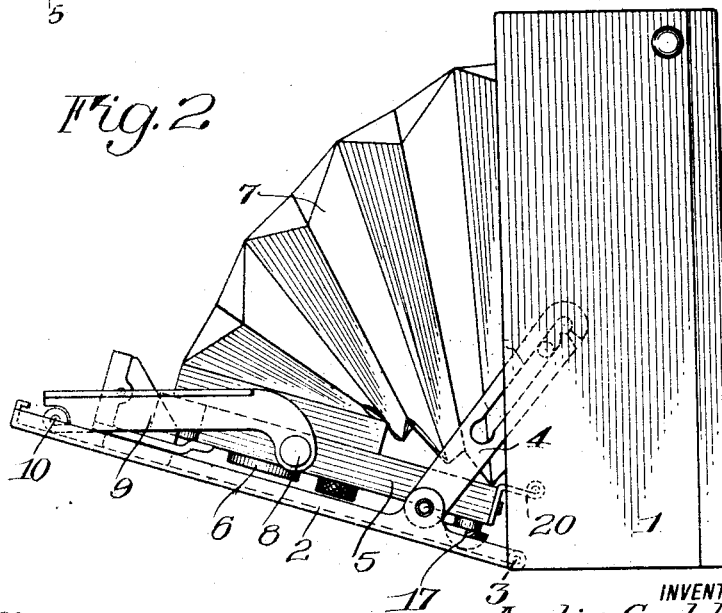
Fig. 2 is a similar view showing the manner in which the camera is folded.

In the practice of my invention, the front 5 is pivoted at 8 at or just above its center between a pair of links 9 hinged at 10 at the front of the bed 2, the hinge being in the nature of an elbow joint that permits the links to fold rearwardly against the bed, as shown in Fig. 2, but to move forwardly only as far as the erect position of Fig. 1, in which they are stopped by the engagement of their forward portions with the bed. The links are rigid with respect to each other, being connected by a flat cross bar 11 at the bottom upon which cross bar one part of the hinge 10 is formed, the other part of the hinge being constituted by a plate 12 secured to the bed at 13 (Fig. 7). A spring 14 coiled about the center of the hinge pintle 10 has a normal tendency to move the links to the erect operative position of Fig. 1. When the links are folded back against the tension of this spring, the front 5 is turned forwardly on its pivot, as shown in Fig. 2, so that it will also lie flat against the bed 2. When the links 9 are released from their folded position and fly upwardly and forwardly, the front 5 is carried with them to an erect position defined by the abutment of the lower edge of the front with the cross bar 11 and this said lower portion is provided in one of its walls (the said front being hollow in the present instance) with a slot 15 (Figs. 5 and 6) in which operates the stem 16 of a spring latch having a button or head 17 that snaps into engagement with the cross bar 11 and locks the front and links together. The rear or inner end of the stem 16 has a fixed washer 18 and a spring 19 engages the washer to operate the latch, which latter is released by the operator with the fingers by moving the button or head 17 upwardly, said button being at a forward accessible point.

When locked to the links in this erect operative position, the front 5 is held rigidly against forward tilting movement on its pivot 8 by the latch 17; it is prevented from tilting forwardly with the links by the explained engagement of the latter with the bed 2 and it is prevented from rocking rearwardly on the link hinge 10 until the latch is released by a leg 20 secured to the bottom of the front and extending downwardly into engagement with the bed 2 at a point well in rear of the hinge center 10.

The bed 2 is also actuated to the operative position of Fig. 2 by a spring 21 (Fig. 1) at its hinge 3 when the bed is released from the usual catch 22 at the top of the camera body that holds it in the folded position of Fig. 4 and in the said folded position of the parts, the links 9 and front 5 are held in their folded position against the bed 2 by being crowded into the storage or bellows chamber of the camera body 1. The operation is therefore as follows.

As soon as the catch 22 is released, the bed 2 immediately projects itself to the operative position of Fig. 1. When it has reached the intermediate position of Fig. 2, the links 9 are no longer confined and they snap forwardly to their erect position under the influence of the spring 14 carrying the front 5 with them. The front automatically locks itself to the links in the operative position of Fig. 1 by means of the latch 17 and the camera is thus instantly extended ready for use, the bellows 7 being carried out with the front. The lower end of the leg 20 is preferably rounded, as shown, so that it will slide along the bed 2 during the last described movements and have a firm engagement with the bed in the operative position of Fig. 1. To fold the camera, the latch 17 is released; the front 5 rotated forwardly and the links 9 folded backward to the position of Fig. 2; the bed links 4 released and the bed folded up to the position of Fig. 4 carrying the parts to the interior of the body 1.

I claim as my invention:

1. In a folding camera, the combination with a body and a hinged bed closing the front thereof, of a pair of links pivoted to the bed to fold rearwardly against the latter, a front pivoted to the links to also fold against the bed and having an operative position in rear of the pivots of the link and bed, a bellows connecting the front and body, a spring for projecting the bed and a spring for raising the links and front into operative position on the bed when the camera is opened.

2. In a folding camera, the combination with a body and a hinged bed closing the front thereof, of a pair of links pivoted to the bed to fold rearwardly against the latter, a front pivoted to the links to also fold against the bed and adapted to abut the links at another point to establish itself in an erect, operative position in rear of the pivots of the link and bed, a fixed rearward brace on the front directly engaging the bed, a bellows connecting the front and body, a spring for projecting the bed and a spring for raising the links and front into operative position on the bed when the camera is opened.

3. In a folding camera, the combination with a body and a hinged bed closing the front thereof, of a pair of links pivoted to the bed to fold rearwardly against the latter, a front pivoted to said links to fold forwardly against the bed after the links have been moved rearwardly, and a fixed rearward brace on the front adapted to engage the bed in normally spaced relationship to the pivots of the links when the camera is extended.

4. In a folding camera, the combination with a body and a hinged bed closing the front thereof, of a pair of links pivoted to the bed to fold rearwardly against the latter and having a vertically disposed flat connecting cross bar, a front pivoted to the links to also fold against the bed and adapted to abut the cross bar to establish itself in an erect, operative position, a bellows connecting the front and body, a spring for raising the links and front into operative position on the bed when the camera is opened and the bed projected and a latch on the front comprising a vertically movable cam head coöperating with the edge of the cross bar on the links to lock the front to the latter.

5. In a folding camera, the combination with a body and a hinged bed closing the front thereof, of a pair of links pivoted to the bed to fold rearwardly against the latter, a front pivoted to the links to also fold against the bed, a spring for raising the links and front into operative position on the bed when the camera is opened and the bed projected, means for locking the front and links together and fixed means on the front coöperating with the bed to prevent rearward folding of the links while the front is in operative position.

AUSTIN CARL FISHER.

Copies of this patent may be obtained for five cents each, by addressing the "Commissioner of Patents, Washington, D. C."